2,831,843
POLYMERIZATION OF VINYL CHLORIDE

Dexter C. Seymour, Wyckoff, N. J., assignor to United States Rubber Company, New York, N. Y., a corporation of New Jersey No Drawing. Application August 1, 1955
Serial No. 525,809

12 Claims. (Cl. 260—92.8)

This invention relates to the polymerization of vinyl chloride, and more particularly to the production of polyvinyl chloride of lower molecular weight.

Polyvinyl chloride resins enjoy a reputation for toughness and durability. One of the principal difficulties in adapting these resins for many applications resides in their high softening temperature. For example, if it is desired to mill polyvinyl chloride into thin sheets the milling temperatures necessary are quite high, i. e., from 300° F. to 340° F. These high temperatures increase the difficulties in processing the resins. A further difficulty encountered during high temperature processing of polyvinyl chloride is a tendency of the resin to decompose. Various stabilizers, e. g., zinc stearate, cadmium stearate, alkyl tin compounds, are commonly added to the polyvinyl chloride to prevent thermal decomposition, but these compounds are effective in retarding decomposition for only a limited time at the temperatures employed. Another undesirable characteristic of polyvinyl chloride resins is their low solubility in readily available solvents. These disadvantages may be overcome by producing polyvinyl chloride of lower molecular weight.

I have discovered that when vinyl chloride is polymerized in the presence of a small amount of dibromochloromethane or bromodichloromethane, the molecular weight of the resultant polyvinyl chloride is lower than in polymerization without such chlorine- and bromine-containing trihalomethane. The chlorine- and bromine-containing trihalomethane acts as a molecular weight modifier or regulator, and the molecular weight of the resultant polyvinyl chloride is lower, the higher the amount of chlorine- and bromine-containing trihalomethane employed. Further, the average molecular weight of the polymer remains essentially constant over the whole course of the polymerization. Thus, a polyvinyl chloride of any desired average molecular weight and with uniform properties may be prepared simply by adjusting the amount of regulator added to the vinyl chloride reaction mixture.

The range of chlorine- and bromine-containing trihalomethane used in the present invention may be from 0.1 to 8% based on the vinyl chloride monomer, depending on the molecular weight of the polyvinyl chloride desired. Generally not more than 6% of the trihalomethane will be used. All parts and percentages referred to herein are by weight. The chlorine- and bromine-containing trihalomethane may be used as a molecular weight regulator for vinyl chloride in the various conventional methods of polymerization, viz: bulk or mass or so-called oil-phase polymerization of the liquefied vinyl chloride; solution polymerization where the vinyl chloride is dissolved in a solvent; suspension or bead or granular polymerization where the vinyl chloride is suspended in the form of large droplets and agitated in an aqueous medium generally containing a non-emulsifying suspending agent such as a protein or gum; and emulsion polymerization where the vinyl chloride is emusified in water by means of a surface-active emulsifying agent. Details of these methods of polymerization generally are found in "Unit Processes in Organic Synthesis," by P. H. Groggins, third edition, pages 847–858 (published by McGraw-Hill Book Company, Inc., N. Y., 1947), and details of the methods of polymerization specifically directed to vinyl chloride are found in "Vinyl and Related Polymers," by C. E. Schildknecht, pages 392–398 (published by John Wiley & Sons, Inc., N. Y., 1952). The regulator of the present invention, as suggested above, is preferably added to the monomer charge before initiation of polymerization in order to obtain the most uniform properties in the polyvinyl chloride product of the polymerization, but, if desired, the vinyl chloride polymerization may be initiated and partially carried out in the absence of the regulator to give a conventional high molecular weight to the polymer thus formed in the first part of the polymerization, and thereafter the regulator may be added to the partially polymerized reaction mixture to give a lower molecular weight to that portion of the polyvinyl chloride formed later in the presence of the regulator of the present invention.

The polymerization reaction is carried out at 25° C. to 60° C. in the presence of a conventional free radical producing polymerization initiator, such as a peroxygen or azo catalyst. Examples of peroxygen catalysts are inorganic peroxides, e. g. hydrogen peroxide and persalts, such as alkali persulfates, alkali perborates, alkali percarbonates; and organic peroxides, e. g., diacetyl peroxide, dibenzoyl peroxide, acetyl benzoyl peroxide, lauroyl peroxide, cumene hydroperoxide, tertiary butyl hydroperoxide. Examples of azo catalysts are alpha, alpha'-azobisisobutyronitrile, and p-methoxybenzene diazo thio-2-naphthyl ether. Catalytic amounts from 0.05% to 2% based on the vinyl chloride monomer may be used.

In the following examples which illustrate the invention, differences in molecular weight of various vinyl chloride polymers are shown by differences in the intrinsic viscosities of the polymers, the lower the molecular weight, the lower will be the intrinsic viscosity. The intrinsic viscosities in the examples were obtained from viscosity measurements at 30° C. of cyclohexanone solutions of the vinyl chloride polymers and of the cyclohexanone solvent. The intrinsic viscosity $[\eta]$ is defined by the equation:

$$[\eta] = \lim_{c \to 0} \left( \frac{\ln \eta_{rel}}{c} \right)$$

where $\eta_{rel}$ is relative viscosity (i. e. viscosity of the solution of polymer relative to that of the solvent), and $c$ is concentration of polymer in grams per 100 cc., the concentration selected being such that $\eta_{rel}$ has a value of from 1.15 to 1.4. Intrinsic viscosity may also be defined by the equation:

$$[\eta] = \lim_{c \to 0} \left( \frac{\eta_{sp}}{c} \right)$$

where $\eta_{sp}$ is specific viscosity, and $\eta_{sp} = \eta_{rel} - 1$, and $\eta_{rel}$ and $c$ are as in the formula first above.

Example I

Into each of a series of five pressure tubes was weighed 0.53 g. of alpha, alpha'-azobisisobutyronitrile. The tubes were cooled to Dry Ice temperature (−77° C.) and into each of four of them was placed 0.26 g. of bromodichloromethane (1.3% of the weight of vinyl chloride to be taken). The fifth tube served as a control. The tubes were then sealed to the vacuum line, the pressure therein was lowered to less than $10^{-4}$ mm., and 19.9 g. of liquid vinyl chloride was distilled into each. After being frozen in liquid nitrogen, the tubes were sealed off and each tube was heated at 30° C. for a different length of time so as to get a different extent of conversion of monomer to polymer from tube to tube.

After the heating step the unreacted vinyl chloride in each tube was measured and the conversion of monomer to polymer was calculated. The polymer in each tube was then isolated and washed several times with methanol and its intrinsic viscosity measured. The data are summarized in the following table:

| Tube No. | Control | 1 | 2 | 3 | 4 |
|---|---|---|---|---|---|
| Time, hrs | 4 | 4 | 6 | 8 | 11.5 |
| Percent Conversion | 13.0 | 11.2 | 18.0 | 28.5 | 42.0 |
| Intrinsic Viscosity | 1.84 | 1.09 | 1.10 | 1.10 | 1.05 |

The intrinsic viscosities in the above table clearly show that those polymers prepared in the presence of bromodichloromethane have a much lower intrinsic viscosity than the control and accordingly a lower molecular weight. Moreover, the constancy of the viscosity of the bromodichloromethane-containing polymers, regardless of the extent of conversion, illustrates that, for a given ratio of regulator to monomer, the polymer molecular weight is substantially independent of the extent of conversion to which the reaction is carried.

*Example II*

Into each of two pressure tubes was weighed 0.27 g. of alpha, alpha'-azobisisobutyronitrile. The tubes were cooled to Dry Ice temperature and in one was placed 0.57 g. (2 mole percent on the vinyl chloride to be added) of dibromochloromethane. The second tube served as a control. Both tubes were then sealed to a vacuum line, the pressure therein was lowered to $10^{-4}$ mm., and 9.97 g. (0.160 mole) of vinyl chloride was distilled into each. After being frozen in liquid nitrogen, each tube was sealed off and heated at 30° C. for 3.5 hrs. After the heating step, the unreacted vinyl chloride in each tube was measured and the conversion of monomer to polymer was calculated. The polymer in each tube was isolated and, after it had been washed several times with methanol, its intrinsic viscosity was measured.

The intrinsic viscosity of the control polyvinyl chloride, which was at 11.5 percent conversion, was 1.8, whereas the intrinsic viscosity of the polyvinyl chloride regulated with the dibromochloromethane, which was at 5.4 percent conversion, was 0.3.

*Example III*

The following suspension polymerization recipe was placed in each of four cold, stainless steel bombs from which the air had been displaced by nitrogen: 100 parts of vinyl chloride, 325 parts of water, 0.37 part of gelatin, 0.2 part of lead acetate, and 0.2 part of lauroylperoxide. To the recipe in the first (control) bomb no regulator was added. To the recipe in the next three bombs was added 0.5 part, 1 part and 2 parts, respectively, of bromodichloromethane. Each bomb was then sealed and heated at 55° C. until the internal pressure had fallen to about 80 p. s. i. (pounds per square inch). The bombs were then cooled, the excess monomer vented, and the bead polymers recovered by filtration, washed with water and dried. The data are summarized in the following table:

| Regulator | Control | $CHBrCl_2$ | | |
|---|---|---|---|---|
| Parts Added | None | 0.5 | 1 | 2 |
| Hours | 10.5 | 10.5 | 12.5 | 12.5 |
| Percent Conversion | 85 | 80 | 83 | 80 |
| Intrinsic Viscosity | 1.02 | 0.78 | 0.67 | 0.53 |

As shown by the intrinsic viscosity figures in the above table, increasing amounts of molecular weight modifier give lower molecular weights. Similarly, the chlorine- and bromine-containing trihalomethane regulators of the present invention may be used to lower the molecular weight of polyvinyl chloride prepared by conventional aqueous emulsion polymerization of vinyl chloride.

British Patent 669,346 and the corresponding Belgian Patent 494,989, and also U. S. Patent 2,647,107, state that various chain transfer agents have been used as regulators for vinyl chloride, viz., carbon tetrachloride, carbon tetrabromide, chloroform, bromoform and ethylene dibromide, and point out their disadvantages. Such excessively large amounts of chain transfer agents must be employed that they deleteriously affect the polymer and an additional process step is needed to isolate the polymer, and further that the rate of polymerization is undesirably retarded by certain of these chain transfer agents, in some cases to such an extent that the rate becomes zero, i. e., the reagent inhibits polymerization. The amount of the bromodichloromethane or dibromochloromethane used in the present invention, viz., 0.1% to 8% of the weight of the vinyl chloride, which gives a satisfactory reduction in molecular weight of the polyvinyl chloride, is a reasonably small amount. The present regulators are used up during the polymerization at such a rate that there is no wide divergence between the molecular weight at the start and that at the end of the polymerization run, and for a given ratio of the present regulator to vinyl chloride monomer, the molecular weight of the polyvinyl chloride is substantially independent of the extent of conversion to which the reaction is carried out. Comparison of the regulating action of the two chemicals of the present invention and of the regulators shown in the above referred patents and of other halogenated alkanes shows that the amount of bromodichloromethane an dibromochloromethane required to reduce the intrinsic viscosity from 1.8 (the value for an unregulated polyvinyl chloride) to 0.6 would be approximately 4.4 and 2.8 parts respectively, per 100 parts of vinyl chloride monomer, i. e., reasonably small amounts within the present range of 0.1 to 8 parts of regulator per 100 parts of vinyl chloride monomer. To reduce the intrinsic viscosity of the polyvinyl chloride by the same amount, i. e., from 1.8 to 0.6, would take, per 100 parts of vinyl chloride monomer, approximately 52 parts of carbon tetrachloride, 41 parts of chloroform, 157 parts of dibromoethane, or 127 parts of ethylene dibromide, all excessively large amounts. Bromoform would give a reduction in intrinsic viscosity of the polyvinyl chloride from 1.8 to 0.6 with approximately 3.4 parts per 100 parts of vinyl chloride monomer, being the single satisfactory regulator named in the above references. Carbon tetrabromide, bromotrichloromethane, dibromodichloromethane and iodoform would regulate vinyl chloride polymerization with very small additions, e. g., approximately 0.01 part of bromotrichloromethane or 0.1 part of iodoform to reduce the intrinsic viscosity of the polyvinylchloride from 1.8 to 0.6, but these materials would be used up so fast that there would be a wide divergence in molecular weight of the polyvinyl chloride during the run, with maximum regulation at the beginning and little, if any, regulation at the end, giving unsatisfactory non-uniform polymers. It seems reasonable that in view of the above no one could successfully select a satisfactory regulator merely by consideration of the structural formulas of various halogenated alkanes. With the above background of the ineffectiveness of the two chlorinated alkanes and two brominated alkanes referred to in the above patents, and the effectiveness of only one of the brominated alkanes, it was indeed surprising, and one could not anticipate, that the specific trihalogenated methanes of the present invention, containing both bromine and chlorine, would be effective regulators for vinyl chloride polymerization.

French Patent 923,547 discloses various classes of bromine- or iodine-containing inorganic and organic compounds for making various resins opaque to X-rays. The bromine- or iodine-containing compounds may be added to the monomer before polymerization or may be mixed into the solid polymer to give the desired opacity to X-rays. The resins disclosed include vinyl chloride, vinyl acetate, styrene and methacrylate and acrylate resins. The patent lists some fifty-odd specific bromine- and iodine-containing compounds including ethylene bromide, bromoform and iodoform, for making the resins opaque to X-rays, but the patent in no way relates to or discloses regulating the polymerization of any of the polymerizable monomers with the bromine- or iodine-containing compounds. As a matter of fact, the great majority of the compounds listed, over 75%, would not act as satisfactory regulators for vinyl chloride polymerization when used in appropriately small amounts, e. g., 01.% to 8% by weight of the vinyl chloride as in the present invention. The bromodichloromethane and dibromochloromethane of the present invention are not specifically disclosed in the French Patent 923,547.

This application is a continuation-in-part of application Serial No. 322,801, filed November 26, 1952, now abandoned.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. The method which comprises polymerizing vinyl chloride at 25° C. to 60° C. in the presence of a free radical producing polymerization initiator and 0.1 to 8%, based on the weight of the vinyl chloride, of a trihalomethane selected from the group consisting of dibromochloromethane and bromodichloromethane.

2. The method which comprises polymerizing vinyl chloride at 25° C. to 60° C. in the presence of a free radical producing polymerization initiator and 0.1 to 8%, based on the weight of the vinyl chloride, of dibromochloromethane.

3. The method which comprises polymerizing vinyl chloride at 25° C. to 60° C. in the presence of a free radical producing polymerization initiator and 0.1 to 8%, based on the weight of the vinyl chloride, of bromodichloromethane.

4. The method which comprises polymerizing vinyl chloride in an aqueous medium at 25° C. to 60° C. in the presence of a free radical producing polymerization initiator and 0.1 to 8%, based on the weight of the vinyl chloride, of a trihalomethane selected from the group consisting of dibromochloromethane and bromodichloromethane.

5. The method which comprises polymerizing vinyl chloride in an aqueous medium at 25° C. to 60° C. in the presence of a free radical producing polymerization initiator and 0.1 to 8%, based on the weight of the vinyl chloride, of dibromochloromethane.

6. The method which comprises polymerizing vinyl chloride in an aqueous medium at 25° C. to 60° C. in the presence of a free radical producing polymerization initiator and 0.1 to 8%, based on the weight of the vinyl chloride, of bromodichloromethane.

7. A process for production of polyvinyl chloride latex which comprises polymerizing vinyl chloride in aqueous emulsion at 25° C. to 60° C. in the presence of a free radical producing polymerization initiator and 0.1 to 8%, based on the weight of the vinyl chloride, of a trihalomethane selected from the group consisting of dibromochloromethane and bromodichloromethane.

8. A process for production of polyvinyl chloride latex which comprises polymerizing vinyl chloride in aqueous emulsion at 25° C. to 60° C. in the presence of a free radical producing polymerization initiator and 0.1 to 8%, based on the weight of the vinyl chloride, of dibromochloromethane.

9. A process for production of polyvinyl chloride latex which comprises polymerizing vinyl chloride in aqueous emulsion at 25° C. to 60° C. in the presence of a free radical producing polymerization initiator and 0.1 to 8%, based on the weight of the vinyl chloride, of bromodichloromethane.

10. A process for production of granular polyvinyl chloride which comprises polymerizing vinyl chloride in non-emulsified aqueous suspension at 25° C. to 60° C. in the presence of a free radical producing polymerization initiator and 0.1 to 8%, based on the weight of the vinyl chloride, of a trihalomethane selected from the group consisting of dibromochloromethane and bromodichloromethane.

11. A process for production of granular polyvinyl chloride which comprises polymerizing vinyl chloride in non-emulsified aqueous suspension at 25° C. to 60° C. in the presence of a free radical producing polymerization initiator and 0.1 to 8%, based on the weight of the vinyl chloride, of dibromochloromethane.

12. A process for production of granular polyvinyl chloride which comprises polymerizing vinyl chloride in non-emulsified aqueous suspension at 25° C. to 60° C. in the presence of a free radical producing polymerization initiator and 0.1 to 8%, based on the weight of the vinyl chloride, of bromodichloromethane.

References Cited in the file of this patent

UNITED STATES PATENTS

| 2,729,627 | Carr | Jan. 3, 1956 |

FOREIGN PATENTS

| 923,547 | France | Feb. 17, 1947 |